July 1, 1969   K. F. SPOREK   3,453,196
BETA-EMITTING RADIOISOTOPE SOURCE SEALED ONTO THE
SURFACE OF AN INERT CARRIER
Filed Nov. 18, 1963
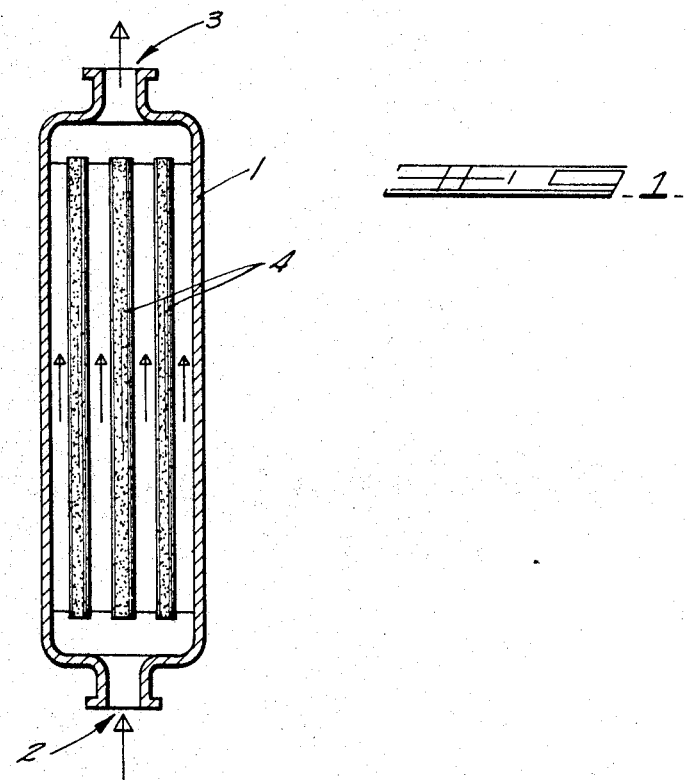
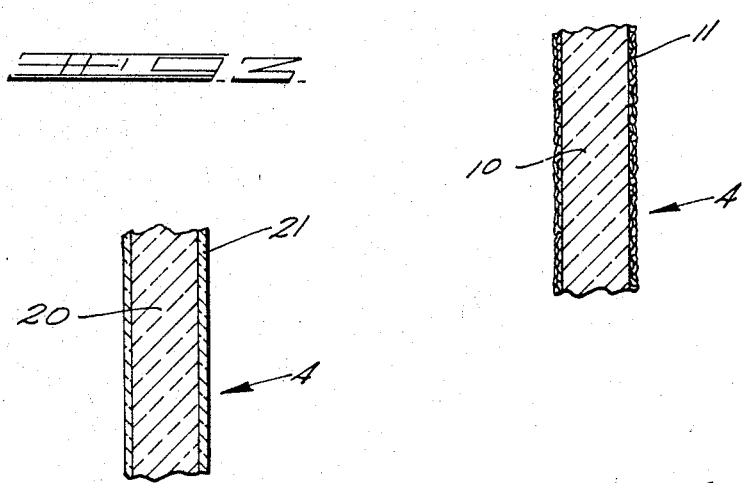
INVENTOR.
KAREL FRANTISEK SPOREK
BY W.A. Schaich &
Charles S. Lynch
ATTORNEYS https://patents.google.com/patent/US3453196

United States Patent Office 3,453,196
Patented July 1, 1969

3,453,196
BETA-EMITTING RADIOISOTOPE SOURCE SEALED ONTO THE SURFACE OF AN INERT CARRIER
Karel Frantisek Sporek, Toledo, Ohio, assignor to Owens-Illinois, Inc., a corporation of Ohio
Filed Nov. 18, 1963, Ser. No. 324,512
Int. Cl. C08f 1/16; B01j 1/10
U.S. Cl. 204—159.22                                       4 Claims

ABSTRACT OF THE DISCLOSURE

A beta-emitting radiation source produced by fusing or coating a mixture of glass and a beta-emitting isotope onto the surface of an inert shaped carrier to provide a highly efficient source of high energy radiation in high concentration at the surface in contact with the reaction medium.

The present invention relates to new catalysts, method of making same and processes wherein the novel catalysts of the present invention are employed. More particularly, the present invention relates to novel catalysts containing beta-emitting radioisotopes and method for improving the efficiency in utilization of available radiation from the beta-emitting radioisotopes in chemical reactions that are activated and initiated by such radiation.

In the past a number of chemical reactions such as polymerizations of organic substances have been initiated and carried out by exposure to high energy or ionizing radiation. The sources of the high energy radiation have included gamma rays, X-rays, beta rays, alpha rays, accelerated electrons, and the like. In the polymerization of a monomer, the reaction proceeds by three separate stages including chain initiation, chain propagation, and chain termination. The radiation functions primarily as an activator in the initiation stage to start the reaction which continues thereafter substantially independently of the radiation. Radiation can also be employed for further chain transfer and modification of the chain structure after formation of the polymer; e.g., curing, crosslinking, and the like. In radiation polymerization, the monomers can undergo polymerization under a variety of conditions including the liquid state, in the gaseous phase, or as a solid. The liquid can be in the form of solutions, dispersions, or emulsions. The initiation step in a polymerization reaction can occur through generation of a free radical or by an ion mechanism. Although radiation produces ions and excited molecules as a primary act, most of the polymerization reactions have been found to proceed by a free radical mechanism wherein the radicals are produced indirectly from the ions or excited molecules.

As compared with use of conventional chemical catalysts, the use of radiation or high energy radiation in polymerization reactions has certain advantages. In processes using chemical catalysts, the catalysts are frequently incorporated in the polymer where they remain as an impurity and may tend to alter the properties of the polymer over a long period of time. The use of radiation involves no introduction of impurities and hence assures that a substantially pure product will be produced.

An additional disadvantage of chemical catalysts resides in the fact that it is frequently necessary to employ higher temperatures than are convenient, as in almost all such cases the catalyst activity is a function of temperature. In most processes employing high energy radiation, the initiation step of the reaction is almost temperature independent, and a wide latitude is permitted in choosing the reaction temperature which is most suitable for the overall process. Hence the use of high energy radiation permits a more uniform reaction, which can be more carefully controlled than is the case when chemical catalysts are employed. In many reactions that involve a rise in temperature an increased rate of reaction occurs which may not be desirable in all instances. In reactions which employ a source of high energy radiation, the temperature rise has little effect on the overall process and the production of free radicals in the initiation step is largely a function of the intensity of the radiation rather than the temperature. Accordingly, this factor also permits closer control of the reaction.

Each particle of high energy radiation carries a relatively large amount of energy which permits it to penetrate within a particular molecule speciment and disrupt the binding forces between the atoms. In the course of this action, one of the most frequent processes that occurs is ionization wherein the incident high energy particle removes an electron from its parent atom or molecule and leaves a charged species termed an ion. The ability to produce ions throughout a particular specimen is a distinct feature of the radiation particles and hence they are often called ionizing radiation. Ionization is not the only method by which the radiation interacts with the incident material and, moreover, in any given chemical reaction it may not be the most important process which is carried out. Hence, the radiation will be referred to herein as high energy radiation to include ionizing as well as nonionizing radiation.

One of the most widespread applications for high energy radiation is the synthesis of long-chain polymers by the poly-condensation of suitable mixtures of polyfunctional compounds or by the addition polymerization of suitable unsaturated compounds which are known as monomers. In the case of addition polymerization, for example, the monomeric units have the same chemical constitution and approximate the chain structure of the resulting polymer. In the case of polycondensation, the units in the polymer chain are slightly different in structure from the reacting monomers insofar as a material such as water may have been eliminated in the polymerization reaction which leads to the formation of the polymer.

The various initial chemical species resulting from the interaction of the high energy radiation with the organic matter to produce ions have special distributions which to a large extent depend on the type of radiation used and have important bearing on the subsequent chemical reactions. The radiation initiated polymerization of vinyl monomers such as styrene methyl methacrylate and the like will produce high molecular weight materials which have particularly desirable properties.

One of the most successful systems of polymerization involving radiation as the catalyst is in the vapor-phase polymerization of ethylene to produce polyethylene.

The efficiency of radiation-initiated polymerizations and other high energy radiation reactions depends largely on the number of energy particles which the reaction mixture is able to absorb per unit volume. The efficiency is also dependent on the energy of the particles and to a lesser extent on the kind of radiation used.

Several methods are known for using high energy radiation for the chemical organic synthesis reactions which are initiated by radiation. Heretofore, many of these methods have employed powerful gamma rays using, for example, the radioactive isotope cobalt-60 as the source. The gamma rays emitted by materials such as cobalt-60 have a strong penetration and will penetrate the reaction vessel and pass directly through the reaction walls, thereby necessitating thick lead shielding around the reaction vessel. Without the required shielding, these processes present a serious danger to operating personnel over long periods. In addition, the strong penetration of the gamma rays means that the energy particles will pass through the reaction medium and an extremely small percentage of them will be absorbed by the reactions. Thus, there is a very low efficiency in utilization of the available gamma rays. Because of the low percentage in absorption of radiation by the reaction medium, relatively large amounts of catalyst are required, which in turn necessitates more shielding. Thus, chemical reactions employing gamma rays as the source of high energy radiation have serious drawbacks because they require large amounts of expensive catalyst and bulky and costly shielding around the reaction zone.

As a result of the substantial and serious disadvantages and shortcomings which accompany the use of gamma rays as the source of high energy radiation, several attempts have been made to employ beta-emitting radioisotopes for the purpose of activating organic substances in chemical reactions. Certain beta-emitting radioisotopes have been used as catalysts heretofore in the form of homogeneous pellets or rods and, although their radiation is more efficient than the gamma radiation in producing ionization of the reaction mixture because of very high absorption of the beta particles by the reaction material, substantial losses in available radiation are encountered. In the beta-emitting radioisotope catalysts employed heretofore, only a relatively small fraction of the energy reaches the surface and can be absorbed by the reaction medium.

Absorption, or stopping, of a particle produces one ion pair for each 30 to 35 electron volts of radiation energy. Thus, when a beta-particle from a radioisotope with a mean energy level of 0.7 mev. (700,000 electron volts) is absorbed, approximately 20,000 ion pairs are produced. This is true also whether the source be an X-ray, gamma-ray or alpha particle, with the proviso that the particle must be completely absorbed by the reaction medium. The difficulty with the use of the strong penetration sources, such as sources emitting gamma rays, is that the gamma ray passes through the reaction zone and is not efficiently absorbed by the reacting components. When employing the known beta-emitting radioisotope catalysts in solid pellet or rod form, for example, a substantial portion of the radiation is absorbed by the catalyst itself.

Accordingly, it is an object of the present invention to provide a novel, high energy radiation source for use in chemical reactions that are initiated or activated by such radiation, and which will overcome the disadvantages and shortcomings of the prior known methods for initiating chemical reactions.

It is a further object of this invention to provide novel catalysts containing a beta-emitting radioisotope which will provide a highly efficient source of high energy radiation for use in chemical reactions which are initiated by radiation.

It is a further object of the present invention to provide a method for making the novel high energy radiation catalysts of the present invention.

It is a further object of the present invention to provide a highly efficient source of beta radiation.

It is a further object of the present invention to provide a method for producing a highly efficient source of beta rays which can be employed in polymerization reactions.

In attaining the above objects, one feature of the present invention resides in providing a high concentration of beta-emitting radioactivity at the surface of the inert carrier material.

Another feature of the present invention resides in sealing a beta-emitting radioisotope onto the surface of an inert, shaped carrier member to provide a highly efficient source of high energy radiation in high concentration at the surface in contact with the reaction medium.

The above objects and features as well as other objects and features will become apparent from the detailed description of the invention which follows, taken in conjunction with the drawings, wherein FIG. 1 is a sectional view of a reactor for containing chemical reactions, showing the high energy radiation catalyst of the present invention;

FIG. 2 is a sectional view of one embodiment of the present invention showing a high energy radiation catalyst sealed onto the surface of the shaped carrier member; and FIG. 3 is another embodiment of the high energy radiation catalyst of the present invention.

It has now been discovered that the efficiency in utilization of available radiation when using a beta-emitting radioisotope can be substantially improved by providing a high concentration of the radioisotope on the surface of an inert carrier therefor which can be a glass or ceramic material. The catalyst structure of the present invention enables a substantial reduction in the total cost of catalyst required for a chemical process, because it maximizes the total radiation obtained per unit of radioactive material employed as catalyst. Moreover, because the source of high energy radiation is a beta-emitting radioisotope, losses of radiation due to strong penetration which would not be absorbed by the reaction medium are eliminated. Thus the catalysts of the present invention are characterized by a high efficiency of ionization due to the short penetration range of the beta particles in solid, liquid, or gaseous media. In addition, because there is an absence of any moving particles, losses due to friction and abrasion of the catalyst particles experienced in moving catalyst beds are eliminated. This absence of friction and abrasion is further advantageous in that contamination of the reaction mixture and final product with small amounts of radioactive dust is avoided.

The beta-emitting radioisotope is sealed onto the surface of a glass or ceramic shaped body which is then positionted in a suitable reactor or reaction vessel employed for containing chemical reactions. The catalyst is placed in the reaction zone in contact with the reacting chemical components. In the most desired embodiment, the reaction mixture, which in the case of polymerization reactions may contain one or more chemical moieties, is permitted to flow between the radioactive surfaces at a distance giving optimum absorption by the reaction mixture of the available radiation. The shaped glass and ceramic members can be in the form of tubes, cylinders, rods, flat plates, rectangular containers, spheres, and the like. The shaped catalyst members are adapted for removal from the reaction vessel for replacement of the radioactive isotope after the isotope has decayed to the point where insufficient radiation is available. The operational life for the catalyst will be partially determined by the half-life of the radioisotope. The radioactive isotope is diffused onto the surface of the inert, shaped carrier member to provide the high concentration of radioactivity at the surface thereof. Among the beta-emitting radioisotopes that can be employed for purposes of the present invention are promethium-147, which is a pure beta-emitter (0.223 mev.). The beta particles have very short penetration distance and even with a multi-curie source, the amount of shielding required would not create a problem. The promethium-147 has a practical half-life of 2.5 years and is commercially available from the Oak Ridge National Laboratories. Other radioisotopes that can be employed for the purposes of the present invention are thallium-204, which is a pure beta-emitter with an energy level of 0.765 mev. and a half-life of 3.57 years; strontium-90, with an energy level of 0.61 mev. and a half-life of 25 years; and technetium-99, with an energy level of 0.29 mev. and a half-life of $2.12 \times 10^5$ years.

The unit of radioactivity which is referred to herein as the curie is defined as the rate of distintegration of the element under consideration. One curie is the amount of radioactive material which disintegrates at the rate of $3.700 \times 10^{10}$ disintegration per second; i.e., at the rate as 1 gram of radium.

The beta-emitting isotopes that are employed for the purposes of the present invention require far less lead shielding to protect operating personnel from deadly radiation in the chemical plant than do the gamma-ray isotopes. For example, the shielding required by promethium-147 is only a tiny fraction of that required for an equivalent amount of cobalt-60. The Oak Ridge National Laboratories has stated that 50 curies of promethium-147 require 12 pounds of lead shielding whereas 18 pounds of lead are required for only 0.012 curies of cobalt-60.

The catalysts of the present invention can be employed in a wide variety of organic syntheses, the most important of which, from a commercial standpoint, are polymerization reactions. The vapor phase polymerization of ethylene is an example of a reaction wherein the catalysts of the present invention have been particularly successful. Certain difficulties have been encountered in the past in attempts to polymerize ethylene gas with high energy radiation sources of strong penetration because gases do not readily absorb radiation. When materials such as cobalt-60 are employed, the gamma-ray radiation passes directly through the reaction media, and the total amount of cobalt-60 required becomes excessively large. Concomitant with the large amounts of cobalt-60 are increased shielding requirements to reduce the danger to personnel, with the result that it is not commercially feasible to carry out these operations on a large scale. Other vinyl monomers such as styrene and methyl methacrylate can be polymerized in the liquid state. However, it is possible to employ the present radioactive catalyst structure for solid, gas, or liquid phase reactions. In addition, the beta-emitting radioistopes can be employed in crosslinking reactions for additional polymerization as well as various other chemical reactions such as the production of alkyl halides, hydrohalogenation, halogenation, oxidation, and reduction in the presence of hydrogen. The dosage that is required to carry out these chemical reactions will vary over a considerable range, depending on the reaction as well as the exact nature of the reaction mixture. In general, the dosage employed will be that sufficient to react the molecules of material and, generally higher doses will produce a higher reaction rate. As a practical matter, each reaction, particularly a polymerization reaction, has an effective upper limit to the amount of radiation that can be used, beyond which the polymer molecules are destroyed at a speed approaching that at which the polymer was produced.

Referring to the accompanying drawings, FIG. 1 is a sectional view of a polymerization reactor 1 which is provided with entry port 2 and exit port 3 for entry and exit of the reactants and final product, respectively, as indicated by the arrows. The radioactive isotope is sealed onto the surface of glass rods 4 to provide the high concentration of radioactive energy in contact with the reaction mixture flowing through the reactor 1.

FIG. 2 is an enlarged, sectional view of a portion of one of the glass rods 4, wherein the glass substrate 10 has the beta-emitting radioactive isotopes 11 in the form of a glass frit which is fused onto the surface of the substrate.

FIG. 3 represents another embodiment of the present invention and shows a sectional view of glass rod 4 wherein the glass substrate 20 which is provided with a thin layer of radioactive glass 21 in the form of a glaze on the substrate.

The radioactive catalyst of the present invention can be made in a number of ways. It has been found that a highly successful way to produce the catalyst is to mix one or more of the radioactive isotopes with a glass which can be of the same composition as the glass which is to form the shaped carrier member. The radioactive isotope is added to the glass in the molten state to form a homogeneous radioactive glass. The radioactive glass in the molten state is then coated on the surface of the glass or ceramic carrier.

Another method for making the novel catalyst structure of the present invention resides in forming a radioactive glass which is then prepared in a finely divided, powdered state. The radioactive glass powder is then deposited on the glass or ceramic substrate to form a radioactive glaze on the surface of the substrate.

As an alternative method for preparing the catalyst of the present invention, the radioactive isotope in proper chemical form, such as the oxide or carbonate, can be directly deposited on the glass or ceramic substrate carrier and fired to sinter or fuse the radioisotope onto the surface of the inert carrier.

The beta-emitting radioisotope catalysts of the present invention can be made by depositing a glass frit containing the radioactive isotope onto the surface of the glass or ceramic substrate and heating to a temperature at least as high as the fusion temperature of the glass or sufficient to fuse the radioactive material to the carrier substrate.

The methods for preparing the radioactive catalysts of the present invention described above result in a fusion of the radioactive isotope to the surface of the glass or ceramic carrier substrate to provide a high concentration of beta-emitting radioisotopes at the surface thereof. Because of the high concentration of radioactivity on the surface of the carrier materials, the losses due to the self-absorption by the radioisotope are markedly reduced so as to increase the efficiency and utilization of available radiation therefrom.

In the preferred embodiment of this invention, glass in the form of sheets, tubes, and rods is employed as the shaped carrier member, and the radioisotope catalyst is deposited in the form of a glass frit. To make the frit, a suitable radioactive isotope, such as promethium-147, is mixed with a base glass composition; e.g., soda-lime glass, and thereafter comminuted to a frit material of small, irregular particle size which frit is fused onto the surface of the glass carrier to produce a carrier with a high concentration of the catalyst on the surface. This method further provides a catalyst with many surfaces which enable greater contact between the reaction medium and the emitted beta particles.

According to the methods of the present invention, the high temperature fusion of the glass or ceramic with the radioisotope is believed to result in at least a partial diffusion of the radioisotope into the surface of the carrier. The result is a tenacious adherence of the radioactive isotope to the carrier, which substantially eliminates any losses due to erosion and friction whereby radioactive dust could constitute a danger to the operating personnel as well as contaminate the final product.

Having thus fully described the invention, what is claimed is:

1. A high energy radiation catalyst for supplying the activating energy to initiate a chemical reaction comprising a shaped member selected from the group consisting of glass and ceramic, said member being provided with a glaze on the surfaces thereof produced by coating said member with a substantially homogeneous mixture of glass and a beta-emitting radioisotope.

2. A high energy radiation catalyst for supplying the activating energy to initiate a chemical reaction comprising a shaped member selected from the group consisting of glass and ceramic, said member having a beta-emitting radioisotope sealed on the surfaces thereof and having been produced by depositing a powdered glass containing said beta-emitting radioisotope on the said shaped member and heating to a temperature sufficient to fuse the said powdered glass onto the surface of said shaped member.

3. In a method for making a high energy radiation catalyst for use in chemical reactions that are initiated by exposure to high energy radiation, the improvement comprising forming a glass frit containing glass and a beta-emitting radioisotope, depositing the glass frit on the surfaces of an inert shaped member selected from the group consisting of glass and ceramic, and heating to fuse the frit onto the surface of said shaped member.

4. The method as defined in claim 3 wherein said beta-emitting radioisotope is a member selected from the group consisting of promethium-147, thallium-204, strontium-90, and technetium-99.

References Cited

UNITED STATES PATENTS

| | | | |
|---|---|---|---|
| 3,264,473 | 8/1966 | Levin et al. | 204—157.1 |
| 3,070,459 | 12/1962 | Schaffer | 117—124 |
| 2,992,980 | 7/1961 | Suttle | 204—193 |

MURRAY TILLMAN, *Primary Examiner.*

R. B. TURER, *Assistant Examiner.*

U.S. Cl. X.R.

117—23, 100, 124; 204—157.1, 159.2, 159.11, 159.14, 193